R. HUFF.
CRANK CASE.
APPLICATION FILED AUG. 7, 1911.
1,024,579.
Patented Apr. 30, 1912.
2 SHEETS—SHEET 2.
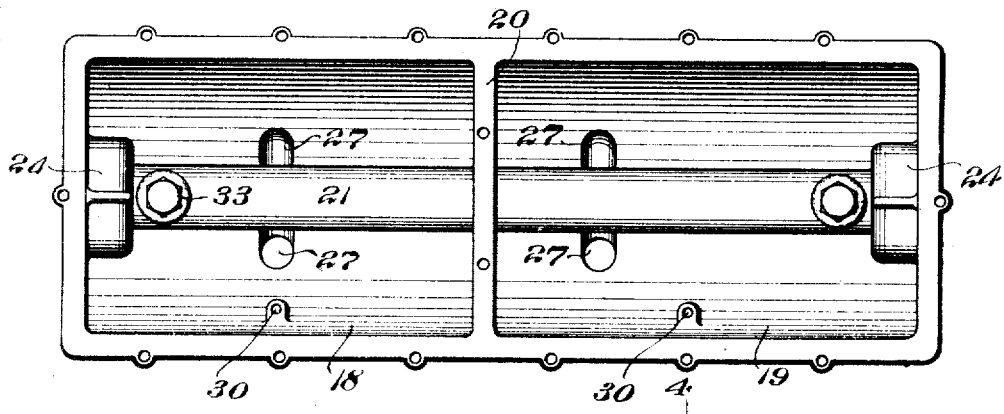
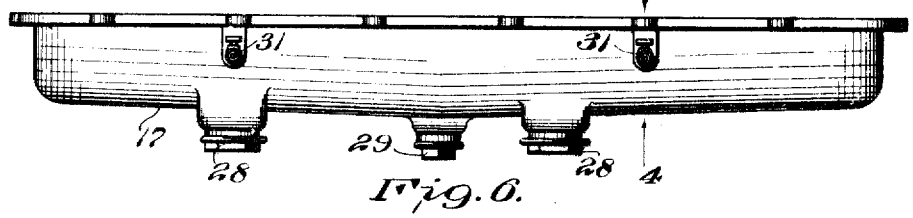
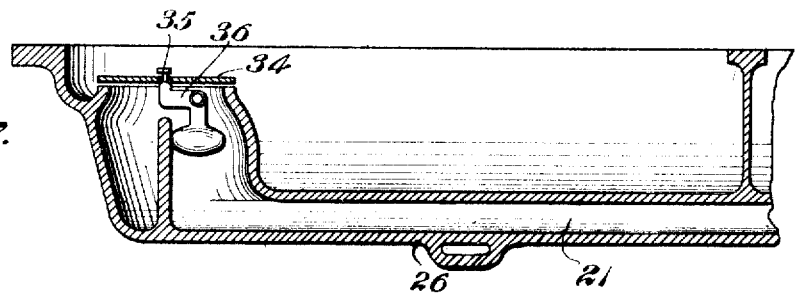
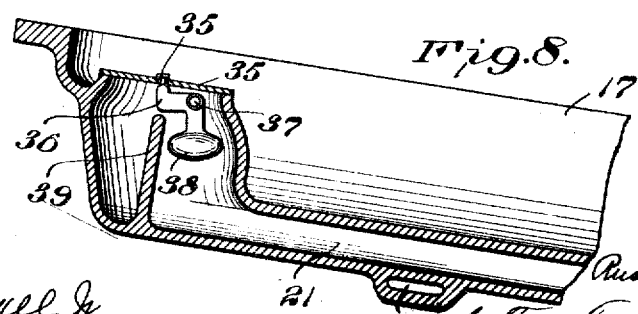
Witnesses
Inventor
Russell Huff
by Foster Freeman Watson
Attorney

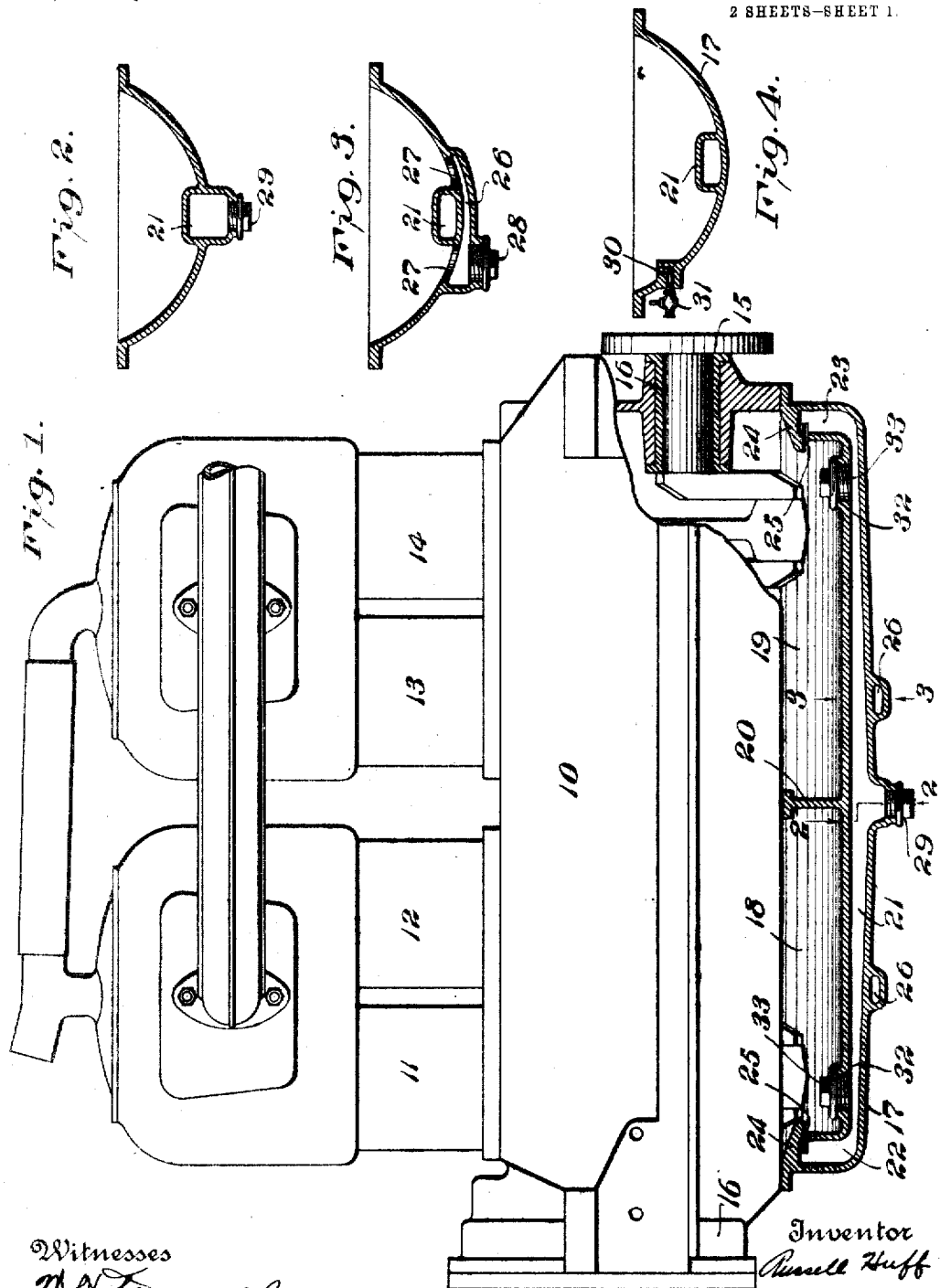

UNITED STATES PATENT OFFICE.

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

CRANK-CASE.

1,024,579.  Specification of Letters Patent.  Patented Apr. 30, 1912.

Application filed August 7, 1911. Serial No. 642,712.

*To all whom it may concern:*

Be it known that I, RUSSELL HUFF, a citizen of the United States, and resident of Detroit, county of Wayne, State of Michigan, have invented certain new and useful Improvements in Crank-Cases, of which the following is a specification.

This invention relates to engines and more particularly to the construction of the crank case therefor.

In the multi-cylindered engine such as, for example, the four-cylindered hydro-carbon engine commonly used on motor vehicles, it is customary to divide the crank case into two compartments which are adapted to contain oil. The motion of the cranks splashes the oil around in the interior of the crank case and lubricates the various bearings and wearing parts. In the case of an engine used on a motor vehicle the level of the oil in the crank case is constantly changing, due to changes in grade in the road, as when the vehicle is ascending and descending hills.

In my prior application, No. 505,735, filed July 2, 1909, I disclosed means for equalizing the level of the oil in the compartments of the crank case and the present invention is an improvement of that construction. In the above-mentioned prior application I showed a duct formed in the crank case and rising to the level of the oil therein and having open ends. The function of this duct is to equalize the level of the oil in the two compartments when the engine is level and to prevent the oil from flowing from one compartment to the other when the engine is inclined. It has been found that with the open end as shown in that construction, oil will be splashed by the cranks into the higher end of the duct, when the vehicle is on an incline, in such quantities as to materially lessen the supply in that compartment and interfere with the proper lubrication.

One of the objects of the present invention is to overcome this disadvantage by providing suitable covers for the ends of the duct.

Another object of the present invention is to form the duct integrally with the bottom wall of the crank case and on the interior thereof so that the crank case will present a smooth exterior surface.

Other objects and the features of novelty will be apparent from the following description taken in connection with the accompanying drawings, in which, Figure 1 is a side elevation of a four-cylindered motor, the lower portion of the crank case being shown in section; Fig. 2 is a transverse section of the lower portion of the crank case on the line 2—2 of Fig. 1; Fig. 3 is a transverse section of the lower portion of the crank case on the line 3—3 of Fig. 1; Fig. 4 is a transverse section of the lower portion of the crank case on the line 4—4 of Fig. 6; Fig. 5 is a top plan view of the lower portion of the crank case; Fig. 6 is a side elevation of Fig. 5; Fig. 7 is a longitudinal section of the lower portion of the crank case and showing a modification of my invention; Fig. 8 is a view similar to Fig. 7, showing the parts in the position assumed when the crank case is inclined.

Referring to the drawings, the motor is shown as comprising a crank case 10 having mounted thereon the cylinders 11, 12, 13 and 14, the cylinders being formed in pairs, as shown. The crank shaft 15 is mounted in bearings 16 at the ends of the crank case. The crank case is provided with a bottom cover 17 which is divided into two compartments 18 and 19 by the partition 20. Along the interior of the bottom cover is formed a duct or passage 21 which has its ends up-turned, as shown at 22, and 23. Arranged above the ends of the duct 21 are the inwardly projecting ledges 24 which serve as means to prevent oil from being splashed into the duct when either end thereof is elevated above the level of the oil. Below the ledges 24, openings 25 are provided for connecting the interior of the duct with the compartments. As shown in Figs. 2, 3 and 4, the duct 21 divides the lower portion of the crank case into two parts and, in order to equalize the level of the oil on the opposite sides of the duct, passages 26 are provided below the duct 21 and have communication with the interior of the crank case by means of openings 27.

In order to provide means for draining oil from the crank case an opening is formed in the lower side of the passage 26. This opening is normally closed by means of a plug 28. In order to drain oil from the duct 21 an opening is formed therein at the lowest point and this opening is normally closed by means of a plug 29. Arranged in the side of the cover 17 are the passages 30, provided with exteriorly arranged pet cocks 31 which are for the purpose of determining the level of the oil in the crank case.

In casting the cover 17 it is necessary to provide means for supporting the core which forms the duct 21 and for this purpose I form the openings 32 which are permanently closed by means of the plugs 33. The openings 25 at the under side of the ledges 24 may be formed in any desired way but I prefer to form them by sawing through the wall of the duct 21 after the casting is made.

In the modification shown in Figs. 7 and 8 I have provided at the upper end of the duct 21, a cover 34 which is loosely mounted at its center on a pivot 35, carried by a lever 36. The lever 36 is in the form of a bell crank and is mounted on a pivot 37, extending transversely of the crank case. The lower end of the lever 36 is provided with a weight 38 which is adapted to cause the lever 36 to have a pendulum motion as either end of the crank case is moved up and down relatively to the other. A stop 39, which is adapted to be engaged by the weight 38, is provided for the purpose of limiting the opening movement of the lever. In Fig. 7 the cover 34 is shown slightly raised from its seat and in Fig. 8 the cover is shown as closed against its seat.

It will be observed that in both of the above described constructions the oil will be prevented from splashing into the duct 21 whenever either end thereof is raised above the level of the oil and that when the crank case is in a level position the oil will be permitted to flow freely from one compartment to the other in order to equalize the levels therein.

It is obvious that various changes in the form and construction of the features of this invention may be made and I therefore do not wish to be limited to the precise constructions shown and described.

Having thus described my invention, what I claim is:

1. In an engine, the combination with a crank case having a plurality of compartments, of a duct formed on the interior of the bottom wall of the crank case and communicating with said compartments, and one of said compartments having a duct connecting the portions thereof on opposite sides of said first mentioned duct.

2. In an engine the combination with a crank case having a plurality of compartments, of a longitudinally extending duct formed on the interior of the bottom wall of the crank case and communicating with said compartments at their remote ends, and said compartments having ducts arranged transversely of said first mentioned duct and connecting the portions of said compartments on the opposite sides of said first mentioned duct.

3. In an engine the combination with a crank case having a plurality of compartments, of a longitudinally extending duct formed on the interior of the bottom wall of the crank case and communicating with said compartments at their remote ends, and said compartments having ducts arranged transversely of and below said first mentioned duct and having communication with said compartments adjacent the walls of said first mentioned duct.

4. In an engine, the combination with a crank case having a plurality of compartments, of a longitudinally extending duct formed on the interior of the bottom wall of the crank case and in communication with said compartments, and each of said compartments having a duct arranged below said first mentioned duct and communicating with the compartment on the opposite sides of said first mentioned duct, and a drain opening in said second mentioned duct.

5. In an engine, the combination of a crank case having a plurality of compartments adapted to contain oil, of a passage extending longitudinally of said crank case and having openings communicating with said compartments at their remote ends and adapted to equalize the level of the oil in said compartments, and means adapted to prevent oil from being splashed into said openings when they are above the surface of the oil.

6. In an engine, the combination with a crank case having a plurality of compartments adapted to contain oil, of a passage extending longitudinally of the crank case and having its end portions turned upwardly in the compartments and means overlying the ends of said passage for preventing oil from being splashed thereinto when said ends are above the surface of the oil.

7. In an engine, the combination with a crank case having a plurality of compartments adapted to contain oil, of a duct extending longitudinally of the crank case and formed on the interior of the bottom wall thereof and having its end portions upturned along the remote end walls of said compartments, and covers arranged over the upturned ends of said duct.

8. In an engine, the combination with a crank case having a plurality of compartments adapted to contain oil, of a passage communicating with said compartments and adapted to equalize the oil therein, and automatically operating closures for the openings in said passage.

9. In an engine, the combination of a crank case having compartments adapted to contain oil and a passage connecting said compartments and adapted to equalize the oil therein, of a closure for the end of said passage, and adapted to be opened and closed by changes in the relative levels of the ends of crank case.

10. In an engine, the combination of a crank case having compartments adapted to contain oil and a passage extending longitudinally of the crank case and having its end portions upturned and opening into the compartments and arranged to equalize the oil in said compartments, and closures for the ends of said passage, each of which is adapted to automatically operate when elevated relatively to the other.

11. In an engine, the combination with a crank case having compartments adapted to contain oil, of a passage extending longitudinally of the crank case and having its end portions upturned and communicating with said compartments, and pivotally mounted closures for the ends of said passage.

12. The combination of a crank case having compartments, a passage connecting said compartments, and means for closing said passage and comprising a pendulum lever and a closure carried by said lever and adapted to be automatically operated thereby.

13. The combination of a crank case having compartments, a passage connecting said compartments, means for closing said passage and comprising a pendulum lever and a closure loosely mounted on said lever and adapted to be automatically operated thereby, and a stop for limiting the opening movement of said lever.

14. The combination of a crank case having compartments adapted to contain oil, a passage connecting said compartments and adapted to equalize the oil therein, and means for closing the openings into said passage and each comprising a pendulum lever adapted to swing longitudinally of the crank case, a closure loosely mounted on the upper arm of said lever, and a stop for limiting the opening movement of said lever.

In testimony whereof I affix my signature in presence of two witnesses.

RUSSELL HUFF.

Witnesses:
W. H. FINCKEL, Jr.,
H. B. WILLIAMS.